United States Patent [19]
Slodki et al.

[11] 3,713,979
[45] Jan. 30, 1973

[54] PRODUCTION OF MANNANS BY FERMENTATION

[75] Inventors: Morey E. Slodki, Peoria; Millie Jo Smiley, Morton; Dwight E. Hensley, Peoria, all of Ill.

[73] Assignee: The United States of America as represented by the Secretary of Agriculture

[22] Filed: May 28, 1971

[21] Appl. No.: 148,131

[52] U.S. Cl. ................................................195/31 P
[51] Int. Cl. ...........................................C12d 1/00
[58] Field of Search............195/31 R, 31 P; 260/209

[56] References Cited

UNITED STATES PATENTS 3,084,105   4/1963   Slodki et al. ....................195/31 P

OTHER PUBLICATIONS

Gorin et al., Can J. Chem. Vol. 47, 1499–1505, 1969.

*Primary Examiner*—Lionel M. Shapiro
*Assistant Examiner*—Gary M. Nath
*Attorney*—R. Hoffman and W. Bier

[57] ABSTRACT

Mannan polymers are produced extracellularly by yeast previously known to produce only phosphomannans. Hydrolysis of the polymers with a mineral acid catalyst results in substantially pure D-mannose.

17 Claims, No Drawings

PRODUCTION OF MANNANS BY FERMENTATION

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to the production of mannan polymers by yeast fermentation in an aqueous medium.

A review by Wickerham and Burton [Bacteriol. Rev. 26: 382-397 (1962)] describes the phylogeny and biochemistry of several yeasts of the genera Hansenula, Torulopsis, and Pichia which elaborate extracellular phosphomannans in high yields when cultured under aerobic conditions in an aqueous medium containing glucose, corn steep liquor, tryptone, potassium dihydrogen phosphate, and trace elements (see also U.S. Pat. Nos. 2,961,378 and 3,021,323).

Jeanes et al. [Can. J. Chem. 40: 1318-1325 (1962)] and M. E. Slodki [Biochim. Biophys. Acta 57: 525-533 (1962)] were able to show by periodate oxidation and acid hydrolysis that the phosphomannans are phosphodiester polymers in which one of the two types of ester linkages present is an acid labile α-hemiacetal phosphate and the other a more stable primary alcohol phosphate link. Thus, hydrolysis of phosphomannans with mineral acid catalyst gives rise to mannose-6-phosphate (U.S. Pat. No. 3,002,966).

Anderson et al. [Arch. Biochem. Biophys. 89: 289-292 (1960)] showed that the molar ratio of mannose to phosphate was not altered by changes in the compositions of the medium. It was also reported that decreasing the amount of inorganic phosphate in the medium was deleterious to polymer synthesis. Our own experience with *Hansenula capsulata* NRRL Y-1842 taught us that when the $KH_2PO_4$ in the culture medium was decreased, phosphomannan yield decreased substantially.

It was therefore, surprising when we discovered that completely eliminating inorganic phosphate from the culture caused the same yeast described above to elaborate a structurally different neutral mannan polymer.

In accordance with the invention, we discovered a process which comprises cultivating *Hansenula capsulata* NRRL Y-1842 or NRRL Y-1889, *H.* sp. n. NRRL YB-1443, *H. holstii* NRRL Y-2154 or NRRL Y-2248, *H. minuta* NRRL Y-411, *Torulopsis pinus* NRRL Y-2023, or *Pichia pinus* NRRL Y-2579 in an aqueous medium containing glucose, corn steep liquor, tryptone, and trace elements under aerobic conditions until a substantial amount of mannan polymer is produced. The resulting mannan polymer is then isolated.

Other examples of yeasts which will elaborate mannan polymers in the above manner are *Hansenula capsulata* NRRL YB-4661, *H.* sp. n. NRRL YB-3070 and NRRL YB-3234, *H. holstii* NRRL YB-2316, NRRL YB-3066, NRRL YB-3341, NRRL YB-347, NRRL YB-2099, and NRRL YB-669, *Pichia* sp. NRRL YB-2097, near *Torulopsis pinus* NRRL YB-2537, *Pichia pinus* NRRL YB-2258, NRRL YB-1307, NRRL YB-3706, and NRRL YB-2022, and *H. minuta* NRRL YB-2203.

All yeasts mentioned herein for the purpose of the instant invention are permanently available in the ARS Culture Collection (NRRL), ARS Culture Collection Investigations, Fermentation Laboratory, Northern Marketing and Nutrition Research Division, ARS, USDA, 1815 North University Street, Peoria, Illinois 61604.

The mannans produced by the instant method are useful as a source of essentially pure D-mannose since D-mannose is the only product obtained from the hydrolysis of the mannan polymer. When tested as wet end additives in papermaking by the handsheet method of McGuire et al. [Tappi 51: 9497 (1968)], the mannans showed activity as deflocculants and gave some increase in paper strength. In other tests, the mannans employed at one part per hundred parts of substance tested acted as dispersants for kaolin, alumina, and zinc sulfide but as flocculants for titanium dioxide, zirconium oxide, and zinc oxide.

DETAILED DESCRIPTION OF THE INVENTION

The existence of mannans in cell walls is well known and documented. There also have been reports of microorganisms which extracellularly produce mannans. However, to our knowledge, there have been no reports of organisms which can produce two extracellular polymers with structures as different as the phosphomannans described by Anderson et al., Jeanes et al., and M. E. Slodki (supra) and the mannan polymers produced according to the instant invention.

Phosphomannans are produced, according to U.S. Pat. No. 2,961,378, under aerobic conditions (0.5 millimole $O_2$/l./min.) at 28° (room temperature) for 96 hours in an aqueous medium containing 6 percent glucose, 0.1 percent corn steep liquor, 0.1 percent tryptone, 0.5 percent $KH_2PO_4$, 0.5 percent Speakman salts solution B [J. Biol. Chem. 58: 395 (1923-24)]. The preferred conditions for the production of mannans are essentially the same as those for the production of phosphomannans with the exception of the complete elimination of inorganic phosphate ($KH_2PO_4$) from the mannan producing culture medium.

Isolation procedures for the two polymers are also the same except for their precipitation from methanol. Phosphomannans will not precipitate without the addition of an electrolyte such as potassium chloride or potassium acetate to the solution, while mannan polymers will precipitate easily from pure methanol. Both the phosphomannan and the mannan polymers precipitated as a white cohesive substance that is easily wound around a stirring rod.

Other differences between the polymers become evident as various analyses are carried out, Table 1.

TABLE 1

| Analysis | Differences | |
| --- | --- | --- |
| | Phosphomannans | Mannans |
| Optical rotation $[\alpha]_D^{25}$ | 0.1 M KCl needed to permit passage of polarized light[1] | No KCl needed |
| Total organic phosphate determination[2] | All examples contain organic phosphate[3] | |

| Acid hydrolysis[1] followed by paper chromatography for hexose phosphates[4] | No organic phosphates | |
|---|---|---|
| | A single spot corresponding to D-mannose-6-phosphate[3] | No spot indicating hexose phosphates |
| Acid hydrolysis[1] followed by paper chromatography for hexoses[4,5] | | |
| | One spot corresponding to D-mannose, and one spot corresponding to D-mannose 6-phosphate[3] | One spot corresponding to D-mannose |

1 Slodki et al., J. Bacteriol. 82: 269-274 (1961).
2 Leloir and Cardini, *Methods in Enzymology*, Vol. III, Academic Press, Inc., New York, 1957, p. 840.
3 M. E. Slodki, Biochim. Biophys. Acta 57: 525-533 (1962).
4 On Whatman No. 1 paper; solvents: ethyl acetate, acetic acid, pyridine, water, 5:1:5:3 v/v.
5 On Whatman No. 1 paper; solvents: n-butanol, pyridine, water, 6:4:3 v/v.

The most significant data showing the differences between phosphomannan and mannan polymers is that which indicates their respective structures Table 2.

TABLE 2

| Polymer | % Mannosyl links[1] | | |
|---|---|---|---|
| | 1,2- | 1,3- | 1,6- |
| Mannan | | | |
| Y-1842 | 80 | 10 | 10 |
| Y-2448 | 74 | 26 | tr |
| Phosphomannan | | | |
| Y-1842[2] | 69 | 0 | 31 |
| Y-1842 mannan fragment | 100 | 0 | 0 |
| Y-2448[3] | 33 | 47 | 20 |
| Y-2448 mannan fragment | 60 | 0 | 40 |

1 Periodate oxidation procedure and chromatographic analysis, M. E. Slodki, Biochim. Biophys. Acta 69: 96-102 (1963).
2 Data, ibid.
3 Data, Jeanes and Watson, Can. J. Chem. 40: 1318-1325 (1962).

Mild acid hydrolysis (heating decationized polymer 20 min., 100°) of Y-1842 phosphomannan in Table 2, supra, gives as one of the products a mixture of unphosphorylated and lightly phosphorylated mannan fragments in overall yield of 13-17 percent. The remaining products are 6-phospho-D-mannopyranosyl-$\beta$-1,2-D-mannose and its $\alpha$-hemiacetal-linked phosphodiester dimer and trimer. The lightly phosphorylated mannan mixture (average molecular weight as determined by incorporation of tritium from NaBT$_4$ or 80,000), $[\alpha]_D^{25}$ +61°, was further separated into a neutral unphosphorylated $\alpha$-mannan (single component) and a lightly phosphorylated $\alpha$-mannan fraction (two components).

It has been reported that another polymer, phosphogalactan, is elaborated by Sporoboromyces sp. in a manner similar to the phosphomanna, described above, M. E. Slodki [J. Biol. Chem. 241: 2700-2706 (1966)]. Since the medium used in phosphogalactan production contains KH$_2$PO$_4$, it might be expected from the discussion above that its elimination would produce a galactan polymer which would correspond to the instant mannan polymer. This is not the case. Although dramatic differences were noted in the polymer produced in the absence from the medium of inorganic phosphates, the products still contained organic phosphates.

EXAMPLE 1

A freshly prepared subculture of each yeast listed in Table 3 was cultivated in a medium having the following composition:

| Component | %, Weight by volume |
|---|---|
| Glucose | 5.00 |
| Corn steep liquor | 0.15 |
| Tryptone | 0.10 |
| Solution B (Speakman salts)[1] v/v | 0.50 |
| Water | balance |

Fermentations were conducted in 300-ml. flasks at 25° C. under aerobic conditions i.e., flask containing 50 ml. broth shaken in a 2-¼-inch stroke rotary shaker at 200 rpm).

At the completion of fermentation, the whole culture was centrifuged (20,000 Xg., 20 min., 15°-25° C.) and the clear broth decanted. The cell-free broth from duplicate pooled flasks was reconstituted to 100 ml. with water and mixed with an equal volume of methanol. The resulting precipitate was recovered, redissolved in about 50 ml. of water, and reprecipitated with 50 ml. of methanol. This precipitate was redissolved in about 50 ml. of water and dialyzed against 4 l. of water for 8 hours at 25° C. The dialyzed solution was centrifuged (20,000 Xg., 20 min., 15°-25° C.), decanted, and lyophilized (see Table 3 for yields).

TABLE 3

| Yeast | NRRL No. | Mannan yield, g./100 ml. culture | Optical rotation $[\alpha]_D^{25}$ |
|---|---|---|---|
| Hansenula capsulata | Y-1842 | 2.1 | +71° |
| Hansenula capsulata | Y-1889 | 3.6 | +83° |
| Hansenula sp. n. | YB-1443 | 1.7 | +73° |
| Hansenula holstii | Y-2154 | 3.5 | +89° |
| Hansenula holstii | Y-2448 | 2.6 | +96° |
| Hansenula minuta | Y-411 | 1.1 | +105° |
| Torulopsis pinus | Y-2023 | 1.3 | +75° |
| Pichia pinus | Y-2579 | 2.7 | +109° |

Analyses. Optical rotation measurements (Table 3) were carried out in a 0.4-dm. cell of an automatic electronic polarimeter and the results calculated according to the formula $[\alpha]_D^{25} = (100\alpha)/(1 \times c)$. The high positive optical values show that the mannosidic linkages are of the $\alpha$-configuration.

Each mannan polymer was analyzed for total organic phosphate by the method of Leloir and Cardini, Methods in Enzymology, Vol. III, Academic Press, Inc., New York, 1957, p. 840. No organic phosphate was detected in the polymers.

Complete hydrolysis of the mannan polymers was accomplished by immersing sealed tubes containing 10-mg. samples and 0.5 ml. 2 N HCl in boiling water for 1 hour.

The presence of hexose phosphates and hexoses was determined by subjecting the hydrolyzates to paper chromatography on Whatman No. 1 filter paper along with appropriate known samples. The solvent system for hexoses and hexose phosphates was ethyl acetate:acetic acid:pyridine:water, 5:1:5:3 v/v, and the system for hexoses was n-butanol:pyridine:water, 6:4:3, v/v. Only a single spot corresponding to known D-mannose was evident with either solvent system.

Ultracentrifugal analysis of a 0.2-percent solution of mannan polymer in 4 M urea in 0.03 M tris-HCl at pH 7.2 showed only one component.

We claim:

1. A process which comprises cultivating *Hansenula capsulata* NRRL Y-1842 or NRRL Y-1889, *H.* sp. n. NRRL YB-1443, *H. holstii* NRRL Y-2154 or NRRL Y-2448, *H. minuta* NRRL Y-411, *Torulopsis pinus* NRRL Y-2023, or *Pichia pinus* NRRL Y-2579 in an aqueous medium containing glucose, corn steep liquor, tryptone, and trace elements under aerobic conditions until a substantial amount of mannan polymer is produced and isolating the mannan polymer so produced.

2. A process as described in claim 1 in which *Hansenula capsulata* NRRL Y-1842 is cultivated to produce mannan polymer.

3. A mannan polymer produced by the process of claim 2, said mannan polymer having an optical rotation of about +71°, and a structure characterized by mannose to mannose linkages which are substantially α in anomeric configuration, said linkages being about 80 percent 1,2-linkages, about 10 percent 1,3-linkages, and about 10 percent 1,6-linkages.

4. A process as described in Claim 1 in which *Hansenula capsulata* NRRL Y-1889 is cultivated to produce mannan polymer.

5. A mannan polymer produced by the process of claim 4, said mannan polymer having an optical rotation of about +83°.

6. A process as described in claim 1 in which Hansenula sp. n. NRRL YB-1443 is cultivated to produce mannan polymer.

7. A mannan polymer produced by the process of claim 6, said mannan polymer having an optical rotation of about +73°.

8. A process as described in claim 1 in which *Hansenula holstii* NRRL Y-2154 is cultivated to produce mannan polymer.

9. A mannan polymer produced by the process of claim 8, said mannan polymer having an optical rotation of about +89° and a strong positive interaction with concanavalin A.

10. A process as described in claim 1 in which *Hansenula holstii* NRRL Y-2448 is cultivated to produce mannan polymer.

11. A mannan polymer produced by the process of claim 10, said mannan polymer having an optical rotation of about +96°, and a structure characterized by mannose to mannose linkages which are substantially α in anomeric configuration, said linkages being about 74 percent 1,2-linkages and about 26 percent 1,3-linkages.

12. A process as described in claim 1 in which *Hansenula minuta* NRRL Y-411 is cultivated to produce mannan polymer.

13. A mannan polymer produced by the process of claim 12, said mannan polymer having an optical rotation of about +105°.

14. A process as described in claim 1 in which *Torulopsis pinus* NRRL Y-2023 is cultivated to produce mannan polymer.

15. A mannan polymer produced by the process of claim 14, said mannan polymer having an optical rotation of about +75°.

16. A process as described in claim 1 in which *Pichia pinus* NRRL Y-2579 is cultivated to produce mannan polymer.

17. A mannan polymer produced by the process of claim 16, said mannan polymer having an optical rotation of about +109°.

* * * * *